United States Patent [19]
Kniewske et al.

[11] Patent Number: 5,463,036
[45] Date of Patent: Oct. 31, 1995

[54] CARBOXYMETHYLCELLULOSE AND ITS USE IN TEXTILE PRINTING

[75] Inventors: Reinhard Kniewske, Fallingbostel; René Kiesewetter, Soltau-Ahlften; Eugen Reinhardt; Klaus Szablikowski, Walsrode, all of Germany

[73] Assignee: Wolff Walsrode Aktiengesellschaft, Walsrode, Germany

[21] Appl. No.: 154,767

[22] Filed: Nov. 18, 1993

[30] Foreign Application Priority Data

Nov. 25, 1992 [DE] Germany .............. 42 39 553.4

[51] Int. Cl.⁶ .................. C08B 11/12; C09D 11/14; D06P 1/38
[52] U.S. Cl. .................. 536/86; 536/97; 536/98; 106/169; 106/23 F; 106/26 R
[58] Field of Search ............. 536/86, 97, 98; 8/445, 562, 115.56

[56] References Cited

U.S. PATENT DOCUMENTS

| | | | |
|---|---|---|---|
| 3,619,451 | 11/1971 | Gill | 536/86 |
| 4,076,935 | 2/1978 | Eichenseer et al. | 536/86 |
| 4,091,205 | 5/1978 | Onda et al. | 536/86 |
| 4,426,206 | 1/1984 | Hosokawa et al. | 8/528 |
| 4,426,518 | 1/1984 | Omiya | 536/98 |
| 4,507,474 | 3/1985 | Raehse et al. | 536/98 |
| 4,525,585 | 6/1985 | Taguchi et al. | 536/98 |

FOREIGN PATENT DOCUMENTS 1346293 11/1963 France .
0255944 4/1988 German Dem. Rep. .

OTHER PUBLICATIONS

Patent Abstracts of Japan, vol. 5, NO. 28 (C–44) [700], Feb. 20, 1981, C Field, JP–A–55,152,701, Adachi Koriyou KK, one page.

Database WPI, Week 8450, Derwent Publications, An 84–309181; JP–A–59,192,786, Sanoy Kokusaku Pulp, Nov. 1, 1984, one page.

*Primary Examiner*—Nathan M. Nutter
*Attorney, Agent, or Firm*—Sprung Horn Kramer & Woods

[57] ABSTRACT

The present invention relates to carboxymethylcellulose (CMC) having a lower degree of substitution and to its use in textile printing.

9 Claims, No Drawings

CARBOXYMETHYLCELLULOSE AND ITS USE IN TEXTILE PRINTING

The present invention relates to carboxymethylcellulose (CMC) with a low degree of substitution, to a process for its production and to its use in textile printing.

Only those sodium carboxymethylcellulose which have a degree of substitution of 2 or higher can at present be used as the only thickeners and flow improvers for reactive printing. The reason why CMC with a lower degree of etherification cannot be used lies in the hardening of the handle of the textile fabric which occurs after printing due to reactions of the CMC with the dye via remaining OH groups.

The reason why a CMC having a degree of substitution below 2 can still react with the reactive dye lies in the structure of CMC and the types of substitution of the carboxymethyl groups within an anhydroglucose unit. Compared with carboxymethylcellulose, alginate, whose $C_6$-position is a carboxyl function so that it has a degree of substitution of carboxyl functions of 1, generally does not react with reactive dyes.

According to the state of the art, therefore, the disadvantages of the hardening of the handle in reactive printing due to the use of CMC as thickener can only be overcome with a degree of substitution above 2.2 (see DE-PS 3 208 430).

The preparation of a CMC having a DS ≧2.2 is, however, cost intensive. Firstly, the yield of reagent decreases with increasing degree of substitution and secondly the salt produced in the reaction leads to low viscosity stages unless it is removed from the CMC by expensive processes.

The technical problem therefore arose of providing a carboxymethylcellulose which does not produce a reaction with the reactive dye and hence hardening of the handle of the substrate (textile fabric) even at degrees of substitution below 2.2. Such a CMC should be comparable with alginate in its yield and its properties in printing.

It was surprisingly found that sodium carboxymethylcellulose having degrees of substitution of from 1.3 to 2.2, in particular from 1.5 to 2.1, overcomes the disadvantages of the state of the art if the CMC is prepared as follows and has the following features:

1. Preparation of a CMC by a slurry process to a degree of substitution of about 0.9 to about 1.2 under stoichiometric conditions.
2. Grinding of the resulting CMC, optionally after purification and drying, to a particle size distribution curve of 100%≦2.0 mm.
3. Further etherification of the CMC mentioned under 1 and 2 in a further etherification process (e.g. semi-dry or slurry process) to produce a CMC having an overall degree of substitution of from 1.3 to 2.2, in particular from 1.5 to 2.1.
4. Drying of the CMC obtained under points 1 to 3 with or without previous complete or partial removal of the by-products of the reaction. Subsequent finishing in the usual, known manner.

It was found that a CMC produced according to points 1 to 4 does not cause hardening of the handle of the substrate in textile printing with reactive dyes. Such a CMC may be used as an alternative to alginate thickeners. The advantage of a CMC produced according to points 1 to 4 lies in the minimal use of reagents and the high active content due to purification after the first reaction stage and hence a high viscosity yield.

The preparation of sodium carboxymethylcellulose by a two-stage process is known per e. U.S. Pat. No. 4,426,518, for example, mentions the preparation of highly etherified CMC by a two-stage slurry process but it is necessary to use a less than stoichiometric quantity of sodium hydroxide solution in the first stage. The said document describes (Column 3, lines 40 to 45) how the process claimed is particularly advantageous for the preparation of a CMC having a DS in the range of from 0.8 to 2.0 and generally leads to products identical to those obtained by the conventional process using stoichiometric quantities of alkali.

The CMCs obtained by the first stage are used for the subsequent etherification as purified and dried but not ground products.

The CMCs produced by two-stage slurry etherification (see e.g. Example 6 in U.S. Pat. No. 4,426,518) do not have the same advantageous properties in textile printing as the CMCs produced by the process according to the invention (see e.g. CMC1, CMC2, CMC4 of the Examples, Table 3, print Nos. 2, 3, 5 and 6). In spite of having the same degree of substitution they produce a hardening of the handle of the printed substrate.

DE-OS 33 03 153 describes a process for the preparation of carboxyalkylcelluloses having an average degree of substitution of >1. The process described is a slurry process in an organic solvent carried out in up to three stages but without any working up between the stages.

In DE-PS 32 08 430 there is claimed a textile printing paste which is characterised in that it contains an alkali metal salt of carboxymethylcellulose having an average degree of substitution of at least 2.2. It is mentioned in the said Patent that CMCs with a low degree of substitution of up to DS 1.5 cannot be used for reactive printing as they still have some reactivity for reactive dyes due to partly unetherified primary OH groups in the $C_6$-position. Only CMCs having a degree of substitution of from 1.7 to 1.85 are used in some cases in combination with sodium alginate but the handle of the printed material remains a problem (see also assessment of the properties in use in Table 3 of the Examples; printing paste No. 6, stock thickener F). Summarizing, it was mentioned in the said Patent that the carboxymethylcelluloses produced by a one-stage or two-stage process cannot replace sodium alginate for printing with reactive dyes so long as the degree of substitution is not above 2.2. DE-PS 32 08 430 therefore claims a CMC having a degree of substitution of at least 2.2 which is capable of replacing sodium alginate in reactive dye pastes and is, moreover, superior to sodium alginate in the ease with which it can be removed by washing.

The present process according to the invention introduces a CMC which has a distinctly lower degree of substitution, namely from 1.3 to 2.2, preferably from 1.5 to 2.1, but which is free from the negative properties of a conventional CMC in this range of degrees of substitution.

The size reduction required after the first stage and optionally after the second stage is carried out as a dry grinding or wet grinding. The types of mills used may be roller mills, ball mills, beater and centrifugal mills, jet mills, swing mills and the like. For improving the ease with which the thickener dissolves when printing the textile material it is advisable to grind the products before use and adjust them to a particle size distribution curve of 100% of ≦2.0 mm.

The carboxymethylcelluloses prepared according to the invention are used as basis for printing pastes in textile printing. They are preferably used alone for this purpose Ldt may also be mixed with other natural or semi-synthetic printing paste bases conventionally used in textile printing, e.g. sodium alginate, starch, modified starches, guar gum, carob bean meal, gum arabic, crystal gum, tragacanth gum, tamarind and/or cellulose ethers, in particular carboxymethylcellulose ethers of known quality as well as with fully synthetic thickeners such as polyacrylates. The quantity of CMCs claimed according to the invention should not be less than 10% in the mixture as the advantage according to the invention is then not obtained.

Carboxymethylcelluloses prepared according to the invention are used as basis for printing pastes in textile printing. The textile materials may be synthetic fibres, natural fibres, mixed fabrics or regenerated cellulose. The dyes used may be e.g. oxidation dyes, sulphur dyes, development dyes, wool dyes, chrome dyes, direct dyes, acid dyes, dispersion dyes, naphthol dyes, vat dyes, metal complex dyes, pigments or trade products consisting of a mixture of a coupling component of development dyes and a diazoamino compound but in particular reactive dyes.

The gel-free and fibre-free cellulose derivatives prepared by the process according to the invention and characterised by the method of measurement described below are distinguished by excellent solution properties and may be used in the textile industry as dispersing agents, binders or thickeners or as flow improvers, especially for textile printing. The sodium carboxymethylcelluloses have excellent qualities and may be used as purified, partly purified or unpurified (technical) products. The products free from gel particles and fibres are soluble in water and the purified substance has viscosities of from 10 to 50,000 mPa.s, preferably from 100 to 30,000 mPa.s (determined on a 2% by weight solution at a shear gradient of $D=2.5\ s^{-1}$ and 20° C. [Rotary Viscosimeter]) and even after the first stage they alrady have transmission values of more than 95%, in particular more than 96% (determined on a 2% by weight aqueous solution in a cup having an optical length of path of 10 mm, using light of wavelength $\lambda=550$ nm). The proportion of water-soluble component amounts to more than 99.9% after the second stage.

The invention will now be described in more detail with the aid of the following Examples. The carboxymethylcelluloses prepared and tested for their properties in use are the following samples denoted by CMC 1 to CMC 5.

To avoid faulty prints due to blockage of the stencils, gauzes or roller screens, the carboxymethyl celluloses mentioned in the following Examples were tested for their transmission and their proportion of water soluble component before they were tested for their performance in use in textile printing. The transmission values of the CMCs 1 to 5 mentioned in the Examples were >96% (Hitachi Spectral Photometer, model 101, Hitachi Ltd, Tokyo, Japan); glass cup with 10 mm optical path length ($\lambda= 550$ nm; 2% by weight solution in distilled water). The proportion of water soluble component amounted to >99.9%.

Preparation of CMC 1

27.5 kg of a finely ground linters cellulose (dry substance content: 94.6%) are suspended in 604.5 litres of isopropanol and 45.5 litres of water under a nitrogen atmosphere in a thermostatically controlled reactor. After the addition of 16.3 kg of sodium hydroxide pellets, the substance is made alkaline for 80 minutes at 25° C. 19.3 kg of an 80% monochloroacetic acid are then added. The mixture is heated to 75° C. within 15 minutes and this reaction temperature is maintained for 120 minutes. The reaction mixture is cooled to 30° C. in 45 minutes and 5.4 kg of sodium hydroxide pellets are then added. After 30 minutes' alkalisation at 28° C., 6.4 kg of an 80% monochloroacetic acid are injected. The reaction mixture is heated to 75° C. within 20 minutes and etherified for a further 120 minutes at 75° C. The reaction mixture is then cooled and separated through a centrifuge. The CMC is suspended in 500 litres of 80% methanol, washed free from salt with 900 litres of methanol in a centrifuge, dried at 70° C. and then ground in a cutting mill. The carboxymethylcelulose has a degree of substitution by carboxymethyl groups of 1.07 (67% yield). The viscosity of the 2% by weight solution (Rotary viscosimeter, Model RV 100, System M 500, measuring apparatus MV according to DIN 53 019, shearing velocity $D=2.5\ s^{-1}$ (T=20° C.)) is 20,600 mPa.s.

For the subsequent reaction, 14.9 kg of the CMC prepared as described above are introduced into. a ploughshare mixer under a nitrogen atmosphere together with 25 litres of isopropanol. 11.5 kg of a 50% alkaline liquor are injected with stirring. The reaction mixture is then alkalised for 30 minutes at about 25° C. 8.2 kg of an 80% monochloroacetic acid are injected. The reaction mixture is heated to 75° C. within 40 minutes and this temperature is maintained for 120 minutes. The reaction mixture is then dried at 70° C. for 24 h. The carboxymethylcellulose (CMC 1) has a degree of substitution by carboxymethyl groups of 1.78. The characteristic data of the CMC are shown in Table 1.

Preparation of CMC 2

CMC 2 is prepared analogously to CMC 1. After the first stage, the carboxymethylcellulose has a degree of substitution by carboxymethyl groups of 1.17 (73% yield). The viscosity of the 2% by weight solution is 38,200 mPa.s. After the second stage, the CMC has a degree of substitution by carboxymethyl groups of 1.65. The characteristic data are shown in Table 1.

Preparation of CMC 3

641 Parts of a commercially available CMC powder (Walocel(R) CRT 40,000 PA) are very intensively mixed with 524 parts of sodium monochloroacetic acid (80%) for 30 minutes in a laboratory kneader. After the addition of 475 parts of a 40% sodium hydroxide solution, the reaction mixture is alkalised for 80 minutes at 25 to 30° C. It is then heated to 61° C. within 20 minutes. After a reaction time of 120 minutes, the product is cooled, dried in a drying cupboard at 55° C. for 24 hours and ground. The degree of substitution by carboxymethyl groups is 1.73. The characteristic data of the CMC are shown in Table 1.

Preparation of CMC 4 (Comparison Example)

127 Parts of a finely ground, bleached and finished linters cellulose are dispersed in 2193 parts of isopropanol under a nitrogen atmosphere in a thermostatically controlled reactor with suitable stirrer and stirred for 15 minutes. 88 Parts of sodium hydroxide pellets in 210 parts of water are then added and the mixture is alkalised for 80 minutes at 25 to 30° C. After the addition of 130 parts of an 80% aqueous monochloroacetic acid, the mixture is heated to 70° C. within 30 minutes and this reaction temperature is maintained for 120 minutes. A further 88 parts of sodium hydroxide pellets are then added in the heat and this is followed by continuous addition of 130 parts of monochloroacetic acid (80%) over a period of 20 minutes. Etherification is then continued for a further 120 minutes at 70° C. The product is filtered and washed with 70% methanol, dried in air and ground. The carboxymethylcellulose obtained has a degree of substitution by carboxymethyl groups of 1.73. The characteristic data are shown in Table 1.

Preparation of CMC 5

205 Parts of a commercially available CMC powder (Walocel(R) CRT 30,000 PS) are introduced into a laboratory kneader and mixed with 139 parts of sodium monochloroacetic acid (80%) for 30 minutes, and after the injection of 126 parts of a 40% sodium hydroxide solution the mixture is alkalised for 80 minutes at 25° to 30° C. The temperature is raised to 60° C. within 20 minutes. After a reaction time of 120 minutes, the product is cooled, dried at 55° C. and ground. The degree of substitution by carboxymethyl groups is 1.19. The characteristic data are shown in Table 1.

TABLE 1

Characteristic data of the CMCs used

| Description | NaCl (%) | Sodium glycolate (%) | (%) (CMC) | Viscosity (mPa.s) | DS[3] first stage | DS[3] second stage | Particle size distribution curve after first stage (mm) |
|---|---|---|---|---|---|---|---|
| CMC 1 | 16.2 | 9.9 | 4 | 21,500[1] | 1.07 | 1.78 | 18% > 0.315<br>82% < 0.315<br>78% < 0.250<br>50% < 0.063 |
| CMC 2 | 15.4 | 10.2 | 4 | 13,600[1] | 1.17 | 1.65 | 18% > 0.315<br>82% < 0.315<br>78% < 0.250<br>50% < 0.063 |
| CMC 3 | 21.9 | 17.4 | 9 | 33,000[2] | 0.95 | 1.73 | 100% < 0.315<br>95% < 0.250<br>40% < 0.063 |
| CMC 4 | 0.05 | 0.03 | 2 | 19,000[1] | — | 1.73 | — |
| CMC 5 | 13.6 | 11.9 | 5 | 31,000[2] | 0.95 | 1.19 | 100% < 0.315<br>95% < 0.250<br>40% < 0.063 |

[1] Viscosity, x% solution, measured with a rotary viscosimeter (Haake), Model RV 100, System M 500, measuring instrument MV, according to DIN 53 019 at a shearing velocity of D = 2.5 s$^{-1}$ (T = 20° C.)

[2] Viscosity, x% solution (Brookfield RVF, Spindle 4, 20 rpm)

[3] average degree of substitution by carboxymethyl groups, see: K. Balser, M. Iseringhausen in Ullmanns Encyclopädie der technischen Chemie, 4th Edition, Volume 9, Verlag Chemie, Weinheim, 1983, pages 192 to 212, determination of DS according to ASTM D-1439/83 a Method B The effect of different carboxymethylcelluloses used according to the invention as thickeners in textile printing is compared in the following Examples with that of a commercial sodium alginate (Lamitex M 5, Protan Company, Norway). Sodium alginate used as a 6% solution was compared with CMCs of various. concentrations but having the same viscosity of the aqueous solution of about 30,000 mPa.s (Brookfield RVF, Spindle 4, 20 rpm).

The composition of the stock thickeners prepared with the carboxymethylcelluloses is shown in Table 2. The printing pastes are obtained by mixing specified quantities of the given stock thickener (90 parts) with specified parts of the dye (10 parts) and distilled water. The dye used is a commercial reactive dye (Cibacron Turkis PG 3® (40%)).

TABLE 2

Composition of the stock thickeners

| Components of thickener | | Stock thickeners[1] | | | | | | |
|---|---|---|---|---|---|---|---|---|
| | | A | B | C | D | E | F | G |
| Lamitex M 5[2] | 6% | 550 | — | — | — | — | 275 | — |
| CMC 1 | 5.5% | — | 500 | — | — | — | — | — |
| CMC 2 | 6% | — | — | 500 | — | — | — | — |
| CMC 3 | 9% | — | — | — | 500 | — | — | — |
| CMC 4 | 2.5% | — | — | — | — | 700 | 350 | — |
| CMC 5 | 5 | — | — | — | — | — | — | 500 |
| Lyoprint AP ®[3] | | 3 | 3 | 3 | 3 | 3 | 3 | 3 |
| Lyoprint RG ®[4] | | 10 | 10 | 10 | 10 | 10 | 10 | 10 |
| Urea | | 180 | 180 | 180 | 180 | 180 | 180 | 180 |
| NaHCO$_3$ | | 25 | 25 | 25 | 25 | 25 | 25 | 25 |
| Permutit | | 232 | 282 | 282 | 282 | 82 | 157 | 282 |
| Water | | | | | | | | |
| Total quantity | | | | 1,000 g | | | | |

[1] in parts by weight
[2] Lamitex M5 contains 5 g/kg of Na hexametaphosphate (Calgon ® T) and 5 g/kg of formalin (37%)
[3] Antifoamant; BASF/Ludwigshafen
[4] Oxidizing agent; BASF/Ludwigshafen Printing tests are carried out with the finished printing pastes, using cotton weft satin (mercerised, bleached) as substrate. The textile fabric is dried at 102 to 105° C. for about 10 minutes (saturated steam fixing (Mathis drier) and fixing by dry heat (hot air) (1 min at 200° C., Mathis drier)). The washing out process is carried out in three stages:

a) thorough cold rinsing, b) treatment near boiling point (10 min), c) cold rinsing.

To assess strength, penetration, shade, handle and levelness, a 64-T stencil (rectangles) and a doctor knife having a diameter of 8 mm are used (magnetic stage 3, velocity stage 3) (Zimmer flat screen printing). A 68-T test stencil and a doctor knife having a diameter of 8 mm (magnetic stage 3, velocity stage 3) are used for assessing the sharpness of outline. The results of the printing processes are shown in Table 3.

TABLE 3

Printing result/comparison with Lamitex M 5 (No. 1), fixing with saturated steam

| Print and printing paste | Stock thickener | Strength[1] | Shade[1] | Penetration | Levelness | Handle | Sharpness of outline |
|---|---|---|---|---|---|---|---|
| 1 | A | 100%[2] | —[2] | —[2] | —[2] | —[2] | —[2] |
| 2 | B | 110% | virtually the same | slightly-distinctly more | virtually the same | virtually the same | slightly-distinctly better |
| 3 | C | 112% | virtually the same | trace-slightly more | virtually the same | virtually the same | distinctly better |
| 4 | D | 105% | virtually the same | trace-slightly more | virtually the same | virtually the same | slightly-significantly better |
| 5 | E | virtually the same | virtually the same | distinctly more | virtually the same | slightly-distinctly worse | distinctly-considerably better |
| 6 | F | virtually the same | virtually the same | trace-slightly more | virtually the same | slightly worse | slightly-distinctly better |
| 7 | G | 130% | slightly less pure | trace more | distinctly inferior | distinctly -considerably inferior | distinctly inferior |

[1] colorimetric measurement
[2] comparison

The technical terms used in the Tables are known to the cellulose and textile printing specialist and require no explanation. See in this connection the chapters entitled "Textildruck" and "Textilfärberei" in Ullmanns Encyclopedie der technischen Chemie, Volume 22, page 565 et seq and page 635 et seq. (Verlag Chemie, Weinheim, 1982).

The table of values given below clearly shows the superiority of the CMCs claimed according to the invention for use in textile printing.

TABLE 4

Exemplary comparison between conventional thickeners used in textile printing and the cellulose ether claimed according to the invention

| Testing for | Alginate (Protan Company) | CMC 1 and 2 (invention) | CMC 4 (comparison Example) |
|---|---|---|---|
| 1. Preservation (formaldehyde) | absolutely essential | not necessary | not necessary |
| 2. Shearing stability | good | good | good |
| 3. Levelness in the print | good | good | good |
| 4. Sharpness of outline in the print | good | very good | good |
| 5. Handle of the printed substrate (ability to be removed by washing) | good | good | poor[1] |
| 6. Penetration of substrate | good | good | good |
| 7. Shade | good | good | good |

TABLE 4-continued

Exemplary comparison between conventional thickeners used in textile printing and the cellulose ether claimed according to the invention

| Testing for | Alginate (Protan Company) | CMC 1 and 2 (invention) | CMC 4 (comparison Example) |
|---|---|---|---|
| 8. Reproducibility | poor | good | good |

[1] does not reach the state of the art even as mixture with alginate

We claim:

1. Carboxymethylcellulose (CMC) having a degree of substitution of from 1.3 to 2.2, prepared by a two-stage process with grinding after the first stage, in which the powder ground after the first stage has a particle size distribution of 100% ≦2.0 mm.

2. Carboxymethylcellulose according to claim 1, etherified in the first stage by a slurry process up to a degree of substitution of about 0.9 to about 1.2.

3. Carboxymethylcellulose according to claim 1, having a transmission value greater that 95% (determined on a 2% by weight aqueous solution in a cup having an optical path length of 10mm of light of wavelength =550 nm) and a water-soluble content of ≧98%.

4. In the reactive printing of textiles wherein to the textile there is applied a thickened dyestuff composition, the improvement wherein said composition contains as a thickener or flow improver a carboxymethylcellulose (CMC) according to claim 1.

5. The method according to claim 4, wherein the CMC is mixed with at least one of sodium alginate, starch, modified starches, guar gum, carob bean meal, gum arabic, crystal gum, tragacanth gum, tamarind and a cellulose ether.

6. The method according to claim 4, wherein the textile comprises synthetic fibers, natural fibers, a mixture of synthetic and natural fibers or regenerated cellulose.

7. The method according to claim 4, wherein the dyes used are oxidation dyes, sulphur dyes, developed dyes (ingrain dyes), wool-chrome dyes, direct dyes, acid dyes, dispersion dyes, naphthol dyes, vat dyes, metal complex dyes, reactive dyes, pigments or products of a mixture of a coupling component of development dyes and a diazoamino compound.

8. Carboxymethylcellulose according to claim 1, having a degree of substitution of from 1.5 to 2.1.

9. Carboxymethylcellulose according to claim 1, having a transmission value greater than 96% and a water-soluble content of $\geqq 99.9\%$.

* * * * *